United States Patent [19]

Tanimoto et al.

[11] 4,373,364
[45] Feb. 15, 1983

[54] METHOD OF CONTROLLING THE TEMPERATURE OF A HEATING FURNACE

[75] Inventors: Sunao Tanimoto, Tokyo; Shinya Tanifuji; Yasuo Morooka, both of Hitachi, all of Japan

[73] Assignee: Hitachi, Ltd., Tokyo, Japan

[21] Appl. No.: 210,169

[22] Filed: Nov. 25, 1980

[30] Foreign Application Priority Data

Nov. 26, 1979 [JP] Japan .............................. 54-152102

[51] Int. Cl.³ .............................................. F27B 9/40
[52] U.S. Cl. ............................................ 72/8; 72/13; 72/200; 432/11; 266/87; 266/96
[58] Field of Search ...................... 432/11, 12, 43, 45; 72/8, 13, 27, 200, 202; 364/477; 266/80, 87, 90, 96

[56] References Cited

U.S. PATENT DOCUMENTS

| | | | |
|---|---|---|---|
| 3,548,171 | 12/1970 | Kodz .................................. | 432/11 |
| 3,604,695 | 9/1971 | Steeper ............................... | 432/11 |
| 4,004,138 | 1/1977 | Morooka et al. .................... | 364/477 |
| 4,255,133 | 3/1981 | Tanifuji et al. ..................... | 432/24 |

Primary Examiner—Francis S. Husar
Assistant Examiner—Jonathan L. Scherer
Attorney, Agent, or Firm—Antonelli, Terry and Wands

[57] ABSTRACT

A temperature controlling method for heating, with a heating furnace having at least one heating zone provided with a controllable heating means, materials charged into the heating furnace such that an aimed temperature of the material is reached by the time when the materials leave the heating furnace. The characteristic feature of the invention resides in that the instructions for changing the operating condition of the heating furnace in response to a change in the rolling condition of the rolling line connected to the heating furnace is treated as a change in the period of stay of the material in the heating furnace. In the controlling system in accordance with the invention, determination of the material temperature rise pattern in response to the change in the staying period of the material in the furnace is made to minimize the supply of fuel to the heating means, and the set temperature of each heating zone is calculated from the thus determined temperature rise pattern. The temperature of the furnace is made in accordance with this set temperature through the control of the heating means. This method effectively applies particularly to the case where there is a change of rolling amount per unit time in the rolling line, change of the suspension time for roll exchange and lot change or the like.

10 Claims, 8 Drawing Figures

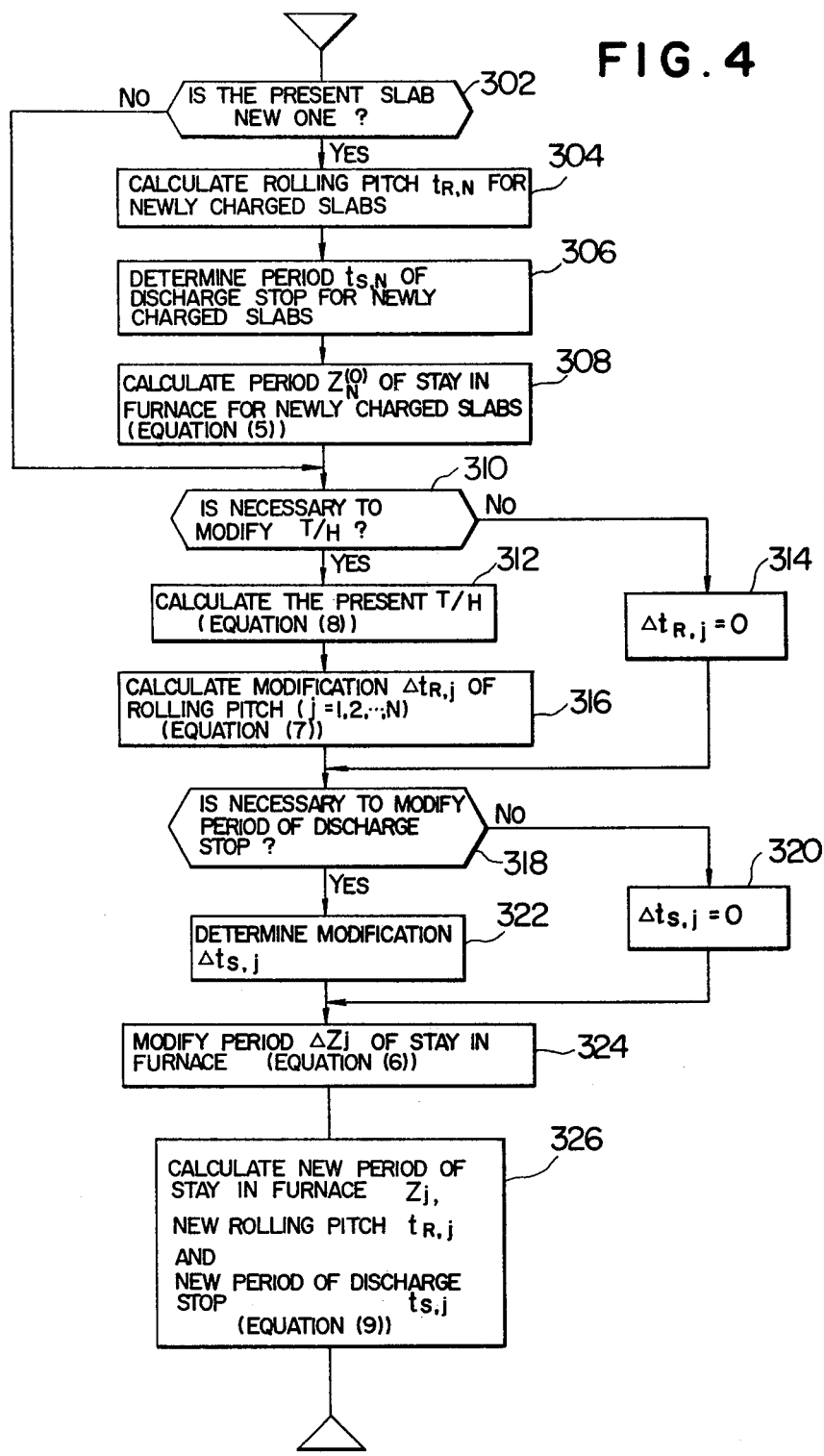

METHOD OF CONTROLLING THE TEMPERATURE OF A HEATING FURNACE

BACKGROUND OF THE INVENTION

1. Field of the Invention

The present invention relates to a method of controlling the operation of a furnace and, more particularly, to a control of combustion in a heating furnace which is used for reheating steel slabs prior to a hot rolling. Still more particularly, the invention is concerned with a method of controlling combustion in a heating furnace which method is adapted for furnace temperature control where operating condition of the furnace are widely varied.

Generally, in a heating furnace, steel slabs charged thereinto are transferred while they are heated up to reach the desired temperature and a good soaking condition before they leave the furnace. The steel slabs taken out of the furnace are delivered to the rolling line to be rolled in accordance with a predetermined rolling plan. Practically, the rolling condition is often changed in accordance with the actual state of the rolling. Usually, the change of the rolling condition is made by the operator in accordance with the signals delivered by a plurality of sensors. The change of rolling condition which is experienced most often is the change of rolling rate per unit time T/H (tons per hour) and pause or suspension of rolling in accordance with the working standard at the time of change of lot. Also, accidental stop of rolling is also included. When such a change of rolling condition is instructed by the operator at the control desk or given by a host computer, the state of operation of the furnace is affected more or less.

2. Description of the Prior Art

It is a common practice to accommodate the change of rolling condition by the change of operation state of the furnace. More specifically, the change of rolling condition is met by heating steel slabs to the aimed temperature as soon as possible and by increasing or decreasing the time length during which the slab is maintained at the aimed temperature. When the heat preservation time is prolonged, the whole part of the furnace including the slab inlet side is disadvantageously raised due to gas flow in the furnace to increase the loss of heat energy from the flue and furnace wall. This poses a serious problem from the view point of saving of energy, because the furnace consumes a considerably large amount of heat, but no effective countermeasure has been proposed yet.

U.S. Pat. No. 3,604,695, entitled "Method and Apparatus for Controlling a Slab Reheat Furnace" discloses a controlling method and apparatus for controlling a heating means in the heating zone of the furnace such that steel slabs leaving the heating zone has been heated to a predetermined temperature. More practically, the average temperature of each slab in the heating zone is predicted as a function of gas temperature in the heating zone, thermal characteristics and size of the slab, position of the slab in the furnace and moving speed and thermal hysteresis, and the heating means are controlled such that the predicted temperature coincides with the desired temperature in accordance with the temperature locus of the slab. It is, however, not preferred from the view point of saving of energy to apply the same furnace temperature locus when the operating conditions of the rolling mills and furnace are changed. The aforementioned U.S. Pat. No. 3,604,695 in no way discloses this point.

SUMMARY OF THE INVENTION

It is a main object of the invention to provide a controlling method in which the slab temperature rise pattern is changed in accordance with the change in the operating conditions of the furnace and rolling mills and the heating control is made in accordance with the changed slab temperature rise pattern.

It is another object of the invention to provide a controlling method in which influences on the heating furnace of the change in the rolling condition is taken account of to modify the slab temperature rise pattern to comply with the requirements for minimizing fuel flow rate, and in which the subsequent heating control is performed in accordance with the modified slab temperature rise pattern.

To this end, according to the invention, there is provided a controlling method which is characterized in that the change of the temperature rise pattern is made while transforming the change of operating condition of the furnace into the change of time length of stay of the slabs in the furnace.

Another feature of the invention resides in that the temperature rise pattern is modified depending upon a change of the time length of stay of the slabs in the furnace in such a manner that the aimed slab temperature is attained when the slabs leave the furnace with minimized fuel consumption, while changing the set temperature of each furnace zone.

BRIEF DESCRIPTION OF THE DRAWINGS

FIG. 4 shows the processing flow of discharging schedule means;

DESCRIPTION OF THE PREFERRED EMBODIMENTS

Before turning to the detailed description of the preferred embodiments, an explanation will be made hereinunder as to the outlines of the heating furnace to which the invention pertains, as well as the outline and basic matters concerning the controlling system of the invention.

Figure 1:
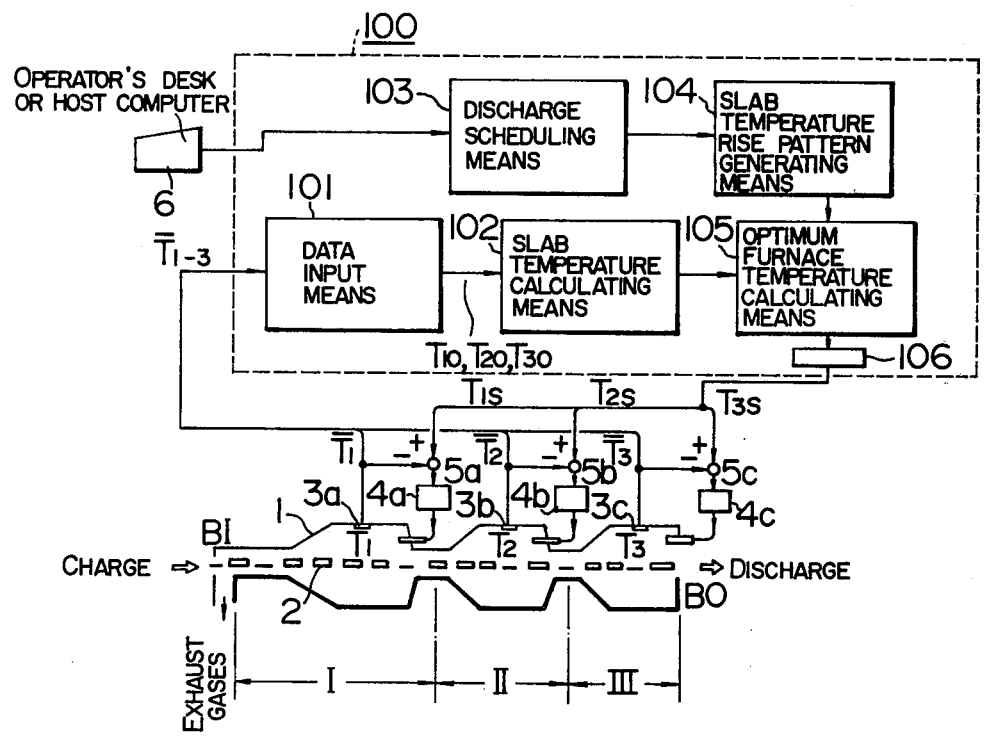
FIG. 1 schematically shows the construction of a heating furnace together with the block diagram of the control system in accordance with the invention.

FIG. 1 shows a heating furnace 1 having three heating zones, i.e. a preheating zone I, a heating zone II and a soaking zone III. Steel pieces 2 (slabs in this embodiment) are charged into the furnace through a charging inlet BI and transferred through the furnace by a walking beam and a pusher. The slabs are heated up to the aimed temperature until they are finally discharged through a discharging outlet BO. While not shown, there are various transfer means, such as means constructed and arranged to move the slabs at a constant pitch, i.e., time interval, in synchronization and means for independently transferring at respective pitches in these heating zones. Reference numerals $3a$ to $3c$ designate furnace zone temperature sensors installed in the first to third heating zones I to III and indicating that the temperatures of respective zones are $T_1$ through $T_3$. Reference numerals $4a$ to $4c$ designate furnace temperature controlling devices for controlling the rate of fuel supply to respective furnace zones to control the temperature in these furnace zones. Comparators $5a$ to $5c$ are adapted to compare the zone temperatures $T_1$ to $T_3$ with respective set temperature $T_{1S}$ to $T_{3S}$ and adapted to deliver signals representing the offset or deviation therebetween to respective furnace temperature controlling devices $4a$ to $4c$.

A fuel control system in accordance with the invention is generally designated by reference numeral 100 and is constituted by data input means 101, slab temperature calculating means 102, discharge scheduling means 103, slab temperature rise pattern generating means 104, optimum furnace temperature calculating means 105 and output means 106.

The data input means 101 periodically receives the furnace temperatures $\overline{T}_1$ to $\overline{T}_3$ (FIG. 1) detected by the sensors $3a$ to $3c$ and effects a digital filtering processing to cut noises. For instance, the following exponential smoothing filtering is conducted.

$$T = (1-\alpha)T^{-1} + \alpha \overline{T} \tag{1}$$

where
- $\alpha$: filtering constant;
- $T^{-1}$: previous filtering value;
- $T$: new filtering value; and
- $\overline{T}$: measured furnace temperatures ($\overline{T}_1$, $\overline{T}_2$, $\overline{T}_3$) in FIG. 1

Measured temperatures $\overline{T}_1$ to $\overline{T}_3$ after filtering are represented here by $T_{10}$, $T_{20}$, $T_{30}$. A reference numeral 6 designates an operator's desk or panel.

Figure 2:
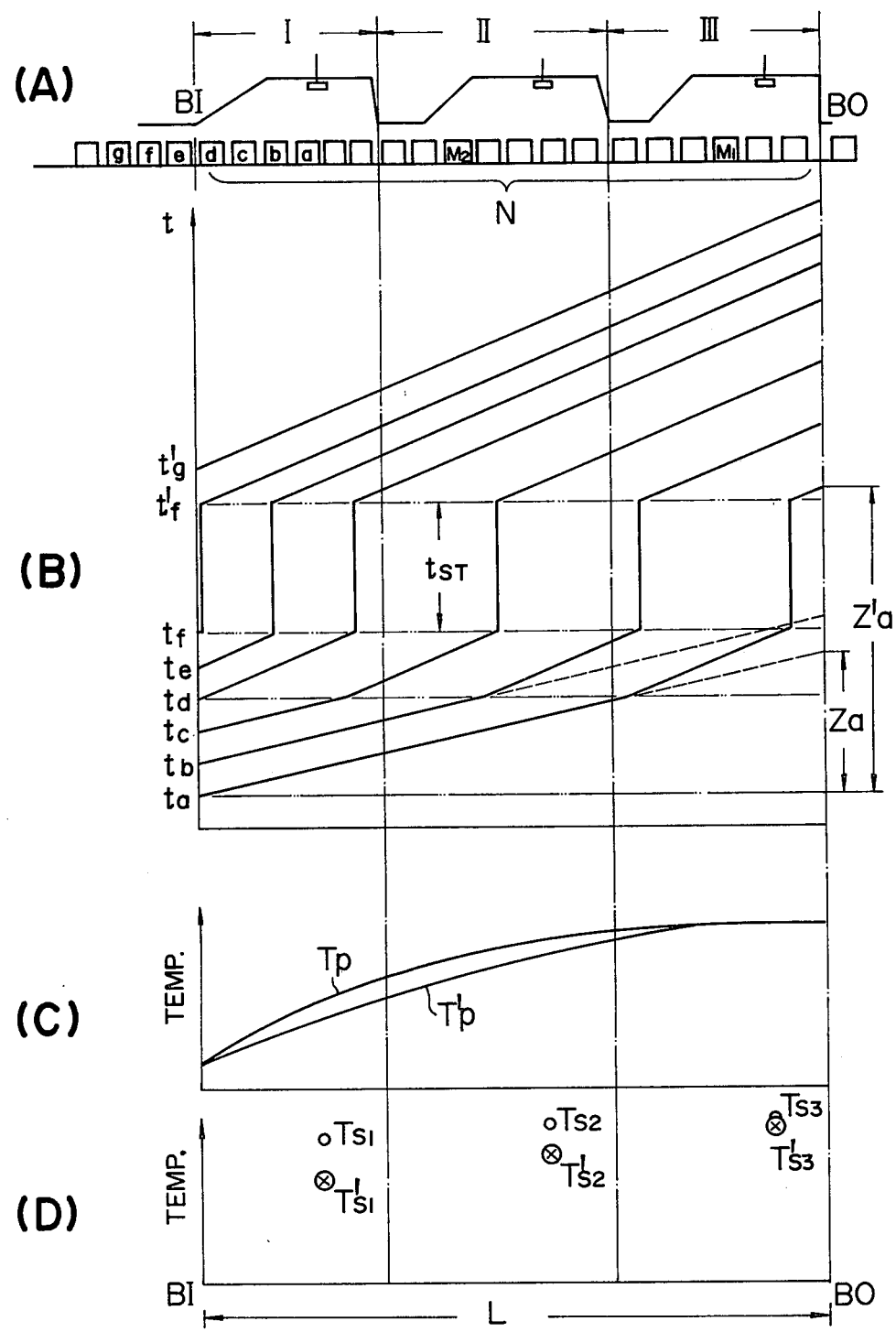
FIG. 2 shows a slab transfer characteristic in the heating furnace from charging to discharging of the slab.

FIG. 2 illustrates a heating furnace of the type having three heating zones. The basic features of the invention will be explained with reference to the drawing. FIG. 2A shows slabs staying in the furnace. There are shown M number of slabs in the furnace. FIG. 2B shows transfer characteristics of slabs from the charging to the discharging. In this Figure, characters $t_a$, $t_b$, $t_c$ . . . represent time for the slabs a, b, c . . . to be charged into the furnace. Referring specifically to the slab a, by way of example, the slab (a) is charged into the furnace at the time $t_a$ and is discharged out of the same at the time $(t_a + Z_a)$ through the discharging outlet BO if there is no change of operating condition. Namely, the slab a is heated up to the aimed temperature during the stay in the furnace, i.e. during the period of time $Z_a$. However, in the event that the discharge pitch is changed at the time $t_d$ or the discharge is stopped at the time $t_f$, the discharge of the slab (a) from the furnace is made at the time $t_a + Z_a'$. This means that the period of stay of the slab a in the furnace is changed from $Z_a$ to $Z_a'$.

Similarly, the slabs b to d are charged at the time $t_b$, $t_c$ and $t_d$, respectively. FIG. 2A shows the state in the furnace at the time $t_d$ of FIG. 2B at which the slab d is charged into the furnace. FIG. 2B further shows the state of charging of the slabs e to f. The discharge of the slab from the furnace is accidentally stopped at the time $t_f$ at which the slab f is just charged into the furnace, so that the charging is delayed by the period of time $(t'_f - t_f) = t_{ST}$. The same applies also to the charging of the slab g so that the charging time is delayed by the same period of time and the charging is made at the time $t'g$.

The same change takes place also in the period of stay of the slabs in the furnace. If the discharge of the slabs is made in accordance with the initial schedule without any change, the staying periods of the slabs a to g are equal. Namely, the following relationship is established.

$$Z_a = Z_b = \ldots = Z_f$$

However, when there is a change of the operating condition as illustrated, the staying periods of the slabs are varied. Therefore, the heating made in accordance with the initial slab temperature rise pattern is not preferred in such a case from the view point of saving of energy, even if the aimed temperature is reached in each slab when it leaves the furnace. That is, the furnace temperature control has to be made in accordance with a modified or changed slab temperature rise pattern.

FIG. 2C shows a slab temperature rise pattern of a specific slab. More specifically, the curves Tp and T'p represent slab temperature rise patterns corresponding to the initial scheduled staying period and a prolonged staying period, respectively. The curves Tp and T'p correspond also to the state before and after the occurence of the accidental discharge stop at the time $t_f$, respectively.

FIG. 2D shows that the set temperatures Ts1, Ts2 and Ts3 of respective furnace zones are changed to T's1, T's2 and T's3 due to the change of the slab temperature rise pattern. A character L represents the length of the furnace. The pattern T'p can be regarded as being a curve along which the slab is heated to the aimed temperature in the changed staying period with minimum fuel flow rate.

Thus, in the controlling method of the invention, the change of operating condition of the furnace is transformed into the change in the period of stay of each slab in the furnace, and the temperature rise pattern is thus calculated in which fuel supply to the furnace becomes minimum when the slab is discharged from the furnace after elapse of the changed staying period. Then, the zone temperatures are set depending upon the slab temperature rise pattern thus determined for furnace temperature control.

The invention will be more fully understood from the following description of the preferred embodiments. A slab temperature calculating means 102 receives furnace zone temperatures $T_{10}$, $T_{20}$, $T_{30}$ from the data input means 101 and calculates the present slab temperature distribution thicknesswise and so on, taking into account the position of the slab. More specifically, the slab is divided into n sections in the thicknesswise direction at predetermined points and the temperature at ith mesh point ($i = 1, 2, \ldots, n+1$) is determined by the following linear difference equations.

$$\theta'_i = \theta_i + \frac{k \cdot \Delta \tau}{c \cdot \rho \cdot \Delta x^2} \cdot (\theta_{i+1} + \theta_{i-1} - 2\theta_i) \tag{2}$$

$$(i = 2, 3, \ldots n)$$

$$\theta'_i = \theta_i + \frac{2k \cdot \Delta\tau}{c \cdot \rho \cdot \Delta x^2} \cdot \left(\theta_l - \theta_i + \frac{Q}{K}\right) \quad (3)$$

$(i = 1, l = 2)$ or $(i = n + 1, l = n)$

The equation (2) above represents the internal temperature of the slab, while equation (3) determines the slab surface temperature.

Where $\Delta\tau$: calculation pitch;

$\theta_i$: temperature at mesh point i the period of time $\Delta\tau$ before;

$\theta'_i$: temperature at mesh point i after the period of time $\Delta\tau$ from the time at which $\theta_i$ is calculated;

K: heat conductivity (at mesh points);

c: specific heat;

$\Delta x$: distance between adjacent mesh points $\rho$: specific gravity;

Q: heat input per unit area and unit time derived from the equation (4) below.

$$Q = 4.88 \cdot \phi_{CG} \cdot \left\{ \left(\frac{T \pm 273}{100}\right)^4 - \left(\frac{\theta_n + 273}{100}\right)^4 \right\} \quad (4)$$

where

T: temperature determined by temperatures ($T_{10}$, $T_{20}$, $T_{30}$) of the zones to which the slab belongs;

$\phi_{CG}$: overall heat absorvity.

After the calculation of the slab temperature at the time $\tau_o$, the slab temperature at the time after the period of time $\tau$ is obtained in accordance with the following procedure. Starting from the slab temperature at the time $\tau_o$, calculations are repeated at intervals of the period of time $\Delta\tau$ to provide temperature rise during the period of time $\tau$. That is, calculation is repeated $\tau/\Delta\tau = Nc$ times to provide the temperature after the period of time $\tau$. It is also possible to preestimate the slab temperature when the heating is made at a specific furnace temperature $\tilde{T}p$ during the period of time $\tau p$ after the present slab temperature is calculated. If it is necessary to heat the slab up to the temperature $\tilde{\theta}p$ after the period of time $\tau p$, the furnace temperature $\tilde{T}_p$ may be varied in order to select a furnace temperature corresponding to the slab temperature $\theta p$, and this selected furnace temperature is output as a set furnace temperature.

An explanation will be made hereinunder as to a discharge scheduling means 103 which is intended for preestimating the timing of discharge of slabs having been charged into the heating furnace, i.e. the period of stay of slabs in the heating furnace (that is, periods of time from the instant of charging to the instant of discharging).

The discharge scheduling means 103 calculates standard period of stay $Z^{(o)}$ in accordance with the following equation, at the time of charging of slabs into the furnace.

$$Z_N^{(o)} = \sum_{i=1}^{N-1} t_{Ri}^{(o)} + \sum_{i=1}^{N} t_{Si}^{(o)} \quad (5)$$

where N represents the number of slabs staying in the furnace, the Nth slab as counted from the dishcarging outlet is a presently charged slab and $t_{Ri}^{(o)}$ represents a standard value of the rolling pitch, i.e. the discharging pitch and $t_{Si}^{(o)}$ represents periods of time during which slab discharge is temporarily stopped. Since rolling speeds can be determined by commonly adopted rolling setup calculation, the term $t_{Ri}^{(o)}$ in equation (5) can be determined as the time length in which the value obtained by integrating the rolling speed by time comes to be equal to the coil length (slab length times slab thickness/coil thickness). On the other hand, periods of time for suspension of the furnace are set taking into account such working standards as periods of time for discharge stop $t_{Si}^{(o)}$, time required for roll replacement, time for periodical inspection, rest time of operators and so forth. By setting the periods of time $t_{Ri}^{(o)}$ and $t_{Si}^{(o)}$, it is possible to determine at the instant of charging the standard periods of stay in the furnace for each of slabs.

After determining the standard period $Z_j^{(o)}$ (j=1 to N) of stay in the furnace in the above-described manner, the heating is conducted to enable each of slabs to reach the aimed temperature in the thus calculated period of stay. The actual period of stay in the furnace, however, is changed by various factors. For instance, if the planned tonnage of rolling per unit time (referred to as "T/H", hereinafter) is changed, the rolling pitch $t_{Rj}^{(o)}$ (j=1 to N) is correspondingly changed to make the period $Z_j$ of stay in the furnace from the standard period $Z_j^{(o)}$ of stay. Also, in the event of an accidental stopping of rolling, i.e. discharge stop of slabs form the furnace, or time of slab discharge or a change in the period of suspension of operation of the furnace from the scheduled one, the period of suspension is naturally changed from the aforementioned period time $t_{sj}^{(o)}$ (j=1 to N), so that the actual period $Z_j$ of stay in the furnace to be changed from the standard period $Z_j^{(o)}$ of stay.

Figure 3:
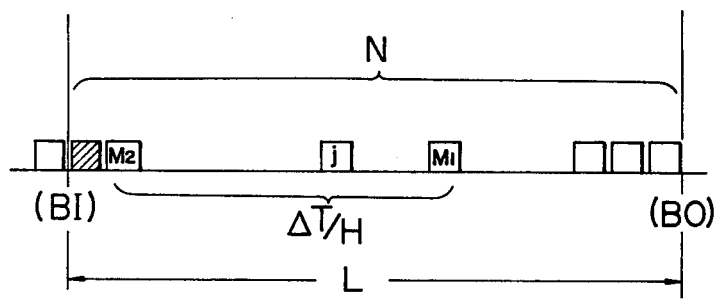
FIG. 3 illustrates the position of the slab in the heating furnace.

Therefore, in the discharge scheduling means 103 conducts, when the operator or a host computer issues a demand for a change of rolling plan T/H or period of suspension, changes in period $\Delta Z_j$ (j=1 to N) of stay are calculated in accordance with the following equation. It is assumed here that the production rate T/H of slabs counting from $M_1$ to $M_2$ is changed by an amount T/H, and the time of suspension before discharge of each slab is changed by $\Delta t_{sj}$, respectively, by a command. FIG. 3 illustrates the positions of slabs. The change $\Delta Z_j$ of staying period is given by the equation (6).

$$\Delta Z_j = \sum_{i=1}^{j} (\Delta t_{Ri} + \Delta t_{Si}) \quad (6)$$

$(j = 1 - N)$ where $$\Delta t_{Ri} = \begin{cases} \frac{Wi}{(T/H) + \Delta T/H} - \frac{Wi}{(T/H)} & (M_1 \leq i \leq M_2) \\ 0 & (i > M_2, i < M_1) \end{cases} \quad (7)$$

$$(T/H) = \frac{\sum_{i=M_1}^{M_2} Wi}{\sum_{i=M_1}^{M_2} (t_{Ri} + t_{Si})} \quad (8)$$

$\Delta Z_j$: change of staying period of the j th slab;

N: number of slabs under heating;

$\Delta t_{Ri}$: changing amount of rolling pitch of i th slab;

$t_{Ri}$: present rolling pitch of slab i (planned amount);

$t_{Si}$: present discharge suspension time of slab i (palnned value);

$W_i$: weight of slab i;

T/H: present rolling production plan from slab $M_1$ to slab $M_2$; and

ΔT/H: amount of change of rolling production plan from slab $M_1$ to slab $M_2$.

As a result of the above stated changes, the staying period Z of the slab under heating, rolling pitch $t_{Ri}$ and suspension time $t_{si}$ are changed as follows respectively.

$$\left. \begin{array}{l} Z_j + \Delta Z_j \to [Z_j] \\ t_{Rj} + \Delta t_{Rj} \to [t_{Rj}] \\ t_{sj} + \Delta t_{sj} \to [t_{sj}] \end{array} \right\} \quad (j = 1 - N) \tag{9}$$

The discharge scheduling means 103 therefore memorizes $Z_j$, $t_{Rj}$, $t_{Sj}$ (j=1 to N), respectively, and renews the memorized values to new values $[Z_i]$, $[t_{Rj}]$, $[t_{sj}]$ which are calculated in accordance with the equation (9) when an instruction is given for the change of schedule. FIG. 4 shows the processing flow chart of the discharge scheduling means. At step 302, a judgement is made as to whether the slab to be charged is a new one. If this slab is not the new one, the process proceeds to step 310 while, if the slab is the new one, the rolling pitch $t_{RN}$ and the discharge suspension time $t_{SN}$ are determined by calculations in steps 304, 306 and the staying period Z is calculated at step 308 in accordance with the equation (5). In step 310, a judgment is made as to whether there is a change of production plan T/H. If there is no change, step 314 conducts the processing on condition of no change of rolling pitch, i.e. $\Delta t_{Rj}=0$, and step 318 is performed. In the event that the production plan T/H is changed, the present production plan T/H is calculated in step 312 in accordance with the equation (8), and the changing amount $\Delta t_{Rj}$ of rolling pitch is conducted in step 316 in accordance with the equation (7). Further, step 318 makes a judgement as to whether there is a change in the discharge suspension time. If there is no change, step 320 is treated as $\Delta t_{sj}=0$ and the process proceeds to step 324. If there is a change, the changing amount $\Delta t_{sj}$ is determined in step 322, and the changing amount $\Delta Z_j$ of staying period is calculated in step 324 from $\Delta t_{Rj}$ and $\Delta t_{sj}$ in accordance with the equation (6). In step 326, changed staying period $[Z_j]$, changed rolling pitch $[t_{Rj}]$ and changed discharge suspension time $[T_{sj}]$ are calculated in accordance with equation (9).

Hereinafter, an explanation will be made as to the slab temperature rise pattern generating means 104 which operates upon receipt of an input signal from the discharge scheduling means 103.

The function of the slab temperature rise pattern generating means is to generate, when the staying period Z is changed, an optimum heating pattern for heating the slab up to the aimed temperature in the renewed staying period.

Generally, in the heating furnace having a multiplicity of heating zones, the slab temperature rise pattern for heating up the slab to the aimed temperature is not definitely presented even if the conditions such as slab thickness, kind of steel, staying period and so forth are given. In other words, there are numerous slab temperature rise patterns for heating the slab up to the aimed temperature. In the embodiment under description, the term "optimum pattern" is used to mean a pattern which achieves the heating up to the aimed temperature with minimum fuel consumption. If the furnace temperature of each heating zone is given, the amount of heat transferred to the slab and the amount of heat loss are determined for each heating zone, so that the rate of supply of fuel to each heating zone is definitely determined. In other words, the flow rate of fuel ($V_{fT}$) is represented as a function of the temperature of each heating zone. For instance, in a heating furnace having three heating zones, the flow rate of fuel $V_{fT}$ is given by the following equation (10), representing the temperatures of respective zones by $T_1$, $T_2$, $T_3$.

$$V_{fT} = \frac{\sum_{j=1}^{N} \Delta Q_{sj}(T_1, T_2, T_3) + \sum_{I=1}^{3} Q_L(T_I)}{(C_1 - C_2) \cdot T_{OUT}} \tag{10}$$

where $\Delta Q_{sj}(T_1, T_2, T_3)$: amount of heat received by slab per unit time;

$Q_L(T_I)$: sum of skid loss heat and heat lost from furnace wall in zone I;

$T_{OUT}$: exhaust gas temperature;

$C_1$, $C_2$: constants; and

N: number of slabs staying in furnace.

Also, the exhaust gas temperature $T_{OUT}$ is given by the following equation (11).

$$T_{OUT} = f_g(T_1) \tag{11}$$

Since the flow rate of fuel $V_{fT}$ is a function of the temperatures $T_1$, $T_2$, $T_3$, it is possible to obtain the minimum fuel flow rate for each zone. Practically, however, there is an upper limit temperature which can be taken by the furnace. This means that there is a practical limit in the flow rate of fuel. It is, therefore, necessary to heat the slab to the aimed temperature range under these restrictions. Namely, the slab temperature rise pattern is determined with minimum fuel consumption under these restrictions. Representing the lower and upper limits of the restrictions of the function $g_k(T_1, T_2, T_3)$ of the furnace zone temperatures $T_1$, $T_2$, $T_3$ by $g_{k1}$ and $g_{k2}$, respectively, the above-mentioned problem can be solved as follows.

$$J = V_{fT} = f(T_1, T_2, T_3) \to \text{Min.} \tag{12}$$

$$g_{k1} \leq g_k(T_1, T_2, T_3) \leq g_{k2} \tag{13}$$

where k=1 to Ma and Ma represents the number of restrictions.

Since the function f and $g_k$ are non-linear functions, the equations (12), (13) belong to the category of non-linear plan. The solution of such problem is made, for example, by Flecher Powell method, complex method and so forth. The furnace zone temperature vector ($T_1$, $T_2$, $T_3$) for minimizing the fuel flow rate $V_{fT}$ is thus obtained, and the slab temperature rise pattern, i.e. the temperature rise curve, is determined correspondingly.

Figure 5:
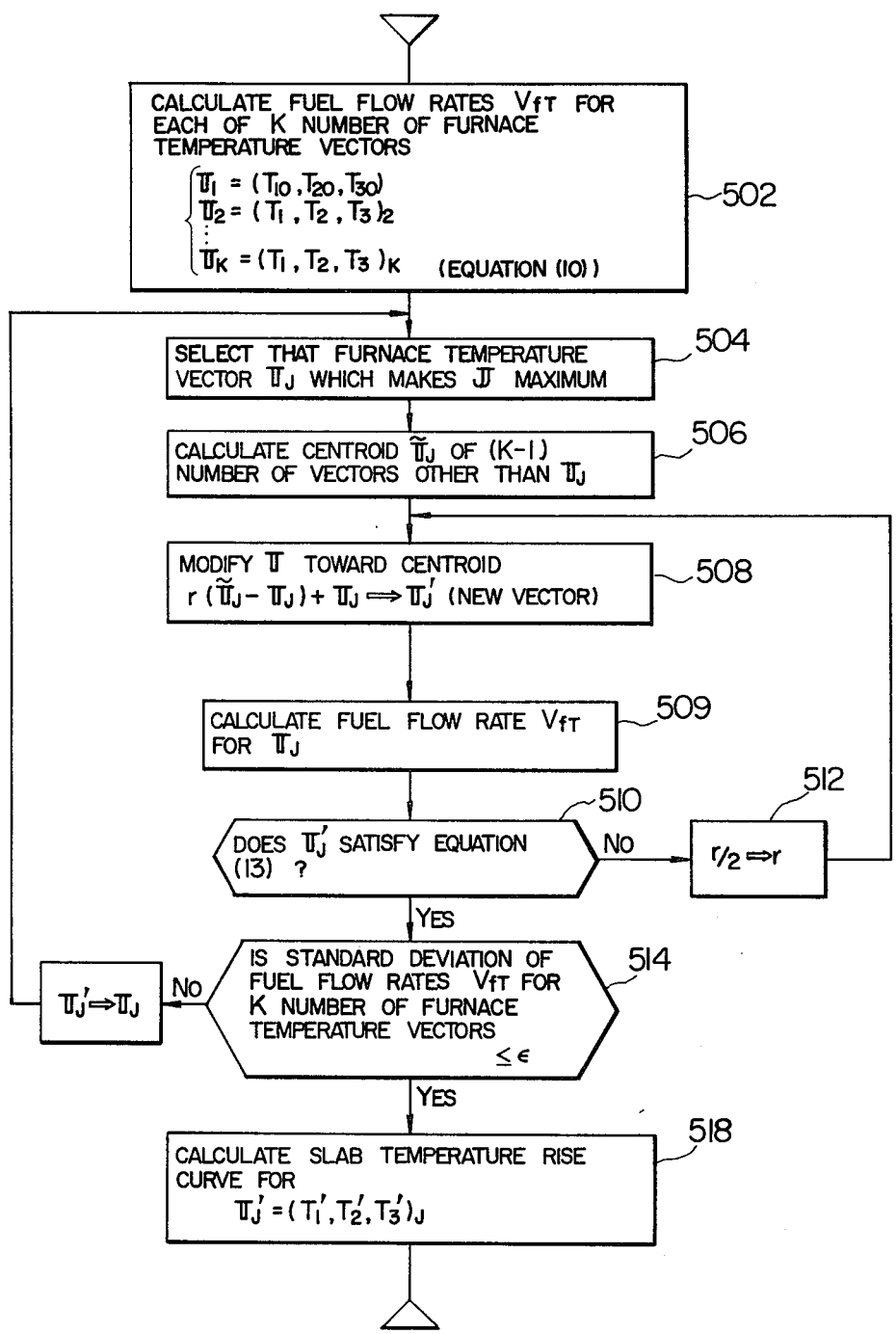
FIG. 5 shows a processing flow chart of slab temperature rise pattern generating means in accordance with a complex method.

Therefore, the slab temperature rise pattern generating means 104 solves the above-mentioned problem for minimization of fuel consumption in accordance with the properties of slab and period of stay in the furnace and generates the optimum slab temperature rise pattern. FIG. 5 shows a flow chart of the process for solving the above-mentioned problem by the complex method.

Referring to FIG. 5, the temperatures of the furnace temperature vector $\mathbb{T}_1$ are equal to the detected zone temperatures $T_{10}$, $T_{20}$, $T_{30}$, on the other hand (K−1) number of vectors $\mathbb{T}_j=(T_1, T_2, T_3)_j$ (j≠1) approximating the present temperature vector are selected. The vectors $\mathbb{T}_j$ which give respective evaluation values to each of the selected vectors are corrected toward the centroids of the other vectors the number of which is (K−1). This operation is made in such a manner that the equation (13) is satisfied by the corrected vector. As this operation is repeated, the furnace temperature vector is moved toward the side of lower evaluation value. The slab temperature rise pattern is determined by the thus obtained furnace temperature vector.

The outline of flow shown in FIG. 5 will be explained hereinunder. In step 502, fuel flow rate $V_{fT}$ is calculated for each of K kinds of furnace temperature vector. In step 504, the furnace temperature vector $\mathbb{T}_J$ which maximizes the fuel $V_{fT}$, i.e. the evaluation function $\mathbb{J}$ is selected. In step 506, calculations of (k−1) vectors $\tilde{\mathbb{T}}_J$ other than $\mathbb{T}_J$ are determined in accordance with the following equation.

$$\tilde{\mathbb{T}}_J = (\tilde{T}_1, \tilde{T}_2, \tilde{T}_3)_J$$

$$\tilde{T}_k = \sum_{i=L}^{k} (k \text{ th element of } \mathbb{T}'_i/(K-1))$$

$(i \neq J)$
$(k = 1, 2, 3)$

In step 508, the vector $\mathbb{T}_J$ is corrected toward the centroid and, in step 509, fuel flow rate $V'_{fT}$ corresponding to $\mathbb{T}'_J$ is calculated. Step 510 conducts a check as to whether the new vector $\mathbb{T}'_J$ satisfies the restriction imposed by the equation (13). If this restriction is not met by the new vector, the amount of correction, i.e. the parameter $\gamma$ is reduced in step 512 and the calculation of the vector $\mathbb{T}'_J$ is made repeatedly, until the condition of the equation (13) is satisfied. When this condition is met by the vector $\mathbb{T}'_J$ standard deviation of the value of fuel flow rate $V_{fT}$ is calculated for each of the K furnace vectors in step 514, and a check is made as to whether the calculated deviation is smaller than the predetermined value $\epsilon$. In case that the calculated deviation is greater than the predetermined value $\epsilon$, steps 504 to 514 are conducted repeatedly using $\mathbb{T}'_J$ in place of $\mathbb{T}_J$ in step 520. To the contrary, if the deviation is smaller than the value $\epsilon$, it is regarded that the furnace temperature vector has been converged and the slab temperature rise curve corresponding to the vector $\mathbb{T}'_J$ is calculated in step 518. The detail of this process is shown in the specification of U.S. Pat. No. 4,255,133, entitled "Method for controlling furnace temperature of multi-zone heating furnace" of the same applicant.

The optimum furnace temperature calculating means 105 is intended for calculating, in accordance with the outputs from the slab temperature calculating means 102 and the slab temperature rise pattern generating means 104, the set value or command of the optimum furnace zone temperature which permits the slab to be heated along the calculated slab temperature rise pattern, i.e. temperature rise curve. More specifically, this means 105 operates, through preestimation calculation of the slab temperature $\theta_p$ after a time interval $Z_p$ to calculate the following amount which represents the deviation from the slab temperature rise pattern.

$$J_I = \sum_{i=M_I}^{N_I} \omega_i \cdot (\hat{\theta}_{pi} - \tilde{\theta}_{pi})^2 \quad (14)$$

-continued $(I = 1, 2, 3)$ where
I: first furnace zone;
$M_I$: leading material in first zone I (outlet side);
$N_I$: last material in first zone I (inlet side);
$\omega_I$: weighting function of position;
$\hat{\theta}_{pi}$: preestimated temperature (mean temperature) of the i th material; and
$\tilde{\theta}_{pi}$: aimed temperature of the i th material (on temperature rise curve) after a time interval $Z_p$.

It is preferred to use a function which gradually increases from the furnace inlet side toward the furnace outlet side as the weight $\omega_1$ of position. In case that the deviation $\hat{J}_1$ is greater than the predetermined standard value $\hat{\epsilon}$, the furnace zone temperature is corrected and the slab temperature after a time interval $Z_p$ is calculated again to make the deviation $J_1$ fall below the standard value $\hat{\epsilon}$.

As has been described, the temperature $T_p$ of each furnace zone for minimizing the deviation from the slab temperature rise pattern is obtained as $T_{p1}$, $T_{p2}$, ... and delivered as the optimum set furnace temperature to the output means 106.

The output means 106 checks and delivers as outputs representing the set values of the furnace zone temperature $T_{1S}$, $T_{2S}$, $T_{3S}$ the predetermined upper and lower levels of the $T_{p1}$, $T_{p2}$, $T_{p3}$ when the values are within the ranges between the upper and lower levels.

The following advantageous effects are derived from the described embodiment of the invention.

Figure 6:
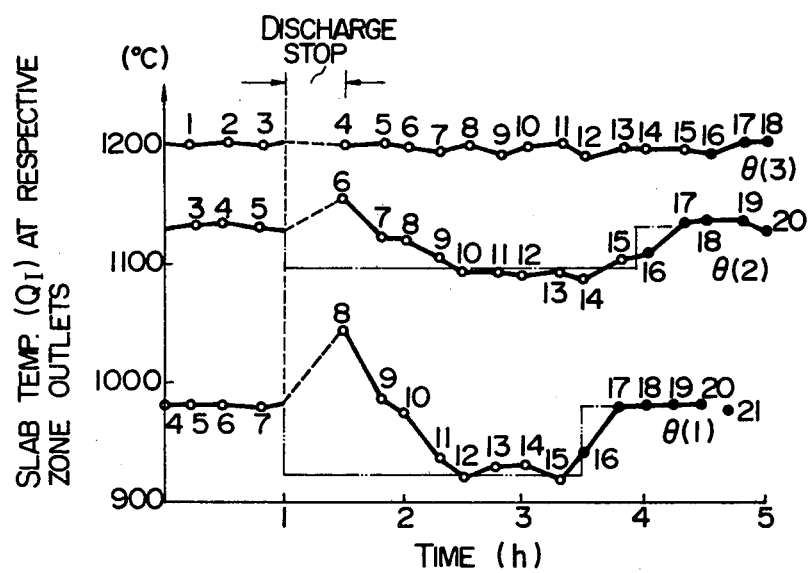
FIG. 6 is an example of record of the slab temperature at the outlet of each furnace zone.
Figure 7:
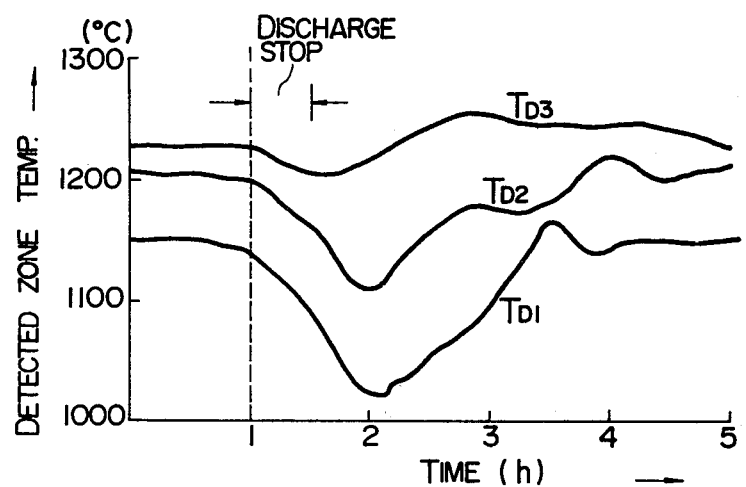
FIG. 7 shows an example of detected transition of temperature of each furnace zone in relation to time.
Figure 8:
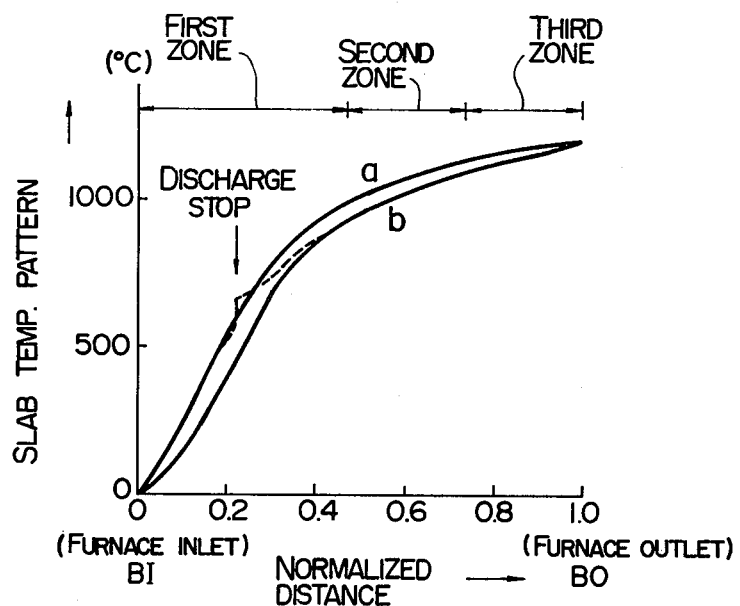
FIG. 8 is an example of heating pattern of a slab positioned at a mid portion of a first furnace zone shown in FIG. 6, before and after stopping.

FIG. 6 shows a record of temperatures of slabs passing through the outlet of respective furnace zones, while FIG. 7 shows an example of transient temperature of each furnace zone. FIG. 8 shows an example of the slab temperature rise pattern of the slab located in an intermediate portion of the first zone I before and after the stopping. These Figures shows the change of operation of the furnace which takes place when an accidental rolling suspension of thirty minutes has occured. FIG. 6 shows the data concerning specific slabs selected out of the slabs passing the zone outlet. These selected slabs bear slab Nos. from 1 to 18 or 21 in the order of discharge. In addition, it is assumed here that the average period of the slabs staying in the furnace for heating up to the aimed temperature is three hours before the occurence of the accidental stop of operation. Since the suspension time of thirty minutes is added, the total average period of stay in the furnace becomes 3.5 hours. Referring to FIG. 6, the slab temperatures $\theta(1)$, $\theta(2)$ of slabs passing through the outlets of first and second zones are deviated considerably from the command temperatures but the aimed temperature 1200° C. is reached by the temperature $\theta(3)$ of the slab just leaving the third zone, i.e. the soaking zone. In the drawings, the circles ○ and solid circles ● represent the slabs charged before and after the suspension. Also, the command temperatures at the outlets of the first and second zones are represented by two-dot-and-dash line and one-dot-and-dash line, respectively.

As will be understood from FIG. 7, the furnace temperature is lowered over the entire zones from the first to third zones after the suspension, as represented by $T_{D1}$, $T_{D2}$, $T_{D3}$ which show the temperatures detected at the first to third zones. The temperature drop is large particularly in the first zone and the heat possessed by the exhaust gas is decreased correspondingly. Also, referring to FIG. 8, the period of stay in the furnace is prolonged and the heating rate is decreased so that the slab temperature rise pattern generally takes a flat and low form. Curves a and b in this Figure show the slab temperature rise pattern before and after the suspension, while the actual temperature rise of the slab are shown by broken line.

A test conducted by the present inventors showed about 20% decrease of the fuel consumption, as well as appreciable improvement in the final temperature of the slab discharged from the heating furnace.

In the embodiment shown in FIG. 1, the temperature of each heating zone is measured at only one point in each zone. This is not exclusive and measurement of the furnace temperature may be taken at two or more points spaced in the longitudinal direction of each zone. By so doing, it is possible to precisely detect the environmental temperature at a position of each slab in one zone, even when there is a certain temperature distribution in the lengthwise direction of the zone. The precision of calculation of slab temperature will be enhanced very much by using the thus obtained temperature as the value of T in the equation (4).

Although the invention has been described through a specific embodiment applied to a heating furnace having three heating zones, the invention can equally be applied to multi-zone type heating furnaces having various number of heating zones, as well as to the cases where a plurality of heating furnaces are installed in the rolling line. In such a case, the period of the slab staying in the heating furnace is determined by the discharging order of slabs in all of the operating heating furnaces not only by the discharging order of the slabs in the furnace concerned. In this case, therefore, a discharge management table common for all furnaces is provided to check the rolling time and suspension time of the slabs in the registered order of the slabs. By so doing, it is possible to determine the period of the newly charged slabs staying in the furnace using the aforementioned equation (5) and to calculate the period of stay in the furnace in response to a change of operating condition making use of equations (6) to (9). Thus, according to the invention, it is possible to determine the period of stay in the furnace for each slab and furnace control for heating the slab to the aimed temperature in the thus given period of stay in the furnace can be made irrespective of control of other furnaces.

As will be understood from the foregoing description, it is possible to conduct the fuel control optimally in response to varying operation conditions of the heating furnace. It is also to be noted that the invention is applicable not only to the heating of slabs but also to the heating of round bar, bloom or like steel materials.

What is claimed is:

1. A temperature controlling method for heating, with a heating furnace having at least one heating zone provided with a controllable heating means, materials charged into said furnace such that said materials are heated up to an aimed temperature when they leave said furnace, said method comprising the steps of:

performing predictive calculation of a staying period of said material in the heating furnace when instructions for changing the operation condition of said heating furnace are detected;

calculating optimum slab temperature rise patterns for respective slabs with at least different staying periods in the heating furnace, along which patterns said materials are heated during the staying periods as obtained in said predictive calculation to attain aimed discharge temperatures and with which patterns a fuel consumption rate required for said heating becomes minimum by determining a minimum fuel flow rate for each zone as a function of furnace zone temperatures and furnace exhaust gas temperature;

computing zone temperatures which minimize deviations of slab temperatures in the respective zones after predetermined periods of time with respect to the optimum slab temperature rise patterns; and controlling furnace temperatures with the computed zone temperatures as settings for the respective zones.

2. A temperature controlling method in accordance with claim 1, wherein the step of computing zone temperatures which minimize slab temperature deviations is performed as a function of slab heat conduction.

3. A temperature controlling method as claimed in claim 1, wherein the staying period of said material in said heating furnace is preestimated in accordance with the time interval of discharge of heated materials from the discharge outlet of said heating furnace.

4. A temperature controlling method as claimed in claim 1, wherein the staying period of time of a material to be charged into said heating furnace is predictively calculated on the the basis of the staying period of materials which have already been charged into said heating furnace and present upstream from the discharge outlet of said heating furnace prior to charging of the material to be charged.

5. A temperature controlling method as claimed in claim 1, wherein the change of operating condition of said heating furnace is sensed through a change of rolling condition of a rolling line connected to said heating furnace.

6. A temperature controlling method as claimed in claim 5, wherein the staying period of said material in said heating furnace is preestimated in accordance with a change in the rolling amount per unit time in said rolling line.

7. A temperature controlling method as claimed in claim 5, wherein a suspension time length of said rolling line is detected and the preestimation of said staying period is made in accordance with the detected time length of suspension.

8. A temperature controlling method as claimed in claim 7, wherein the time length of suspension of said rolling line for roll exchange is detected and said staying period of said material to be heated is preestimated in accordance with the thus detected suspension time length.

9. A temperature controlling method as claimed in claim 7, wherein the time length of suspension of said rolling line for periodical inspection is detected and said staying period of said material to be heated is preestimated in accordance with the thus detected suspension time length.

10. A temperature controlling method as claimed in claim 7, wherein the time length of accidental stopping of said rolling line is detected and said staying period of said material to be heated is preestimated in accordance with the thus detected stopping time length.

* * * * *